US010203736B2

(12) United States Patent
Lam et al.

(10) Patent No.: US 10,203,736 B2
(45) Date of Patent: Feb. 12, 2019

(54) DETACHABLE COMPUTING SYSTEM HAVING BI-DIRECTIONAL POWER FLOW

(71) Applicant: INTEL CORPORATION, Santa Clara, CA (US)

(72) Inventors: Hue Lam, Portland, OR (US); Alexander Uan-Zo-Li, Hillsboro, OR (US); Patrick Leung, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 414 days.

(21) Appl. No.: 14/128,038

(22) PCT Filed: Jun. 28, 2013

(86) PCT No.: PCT/US2013/048713
§ 371 (c)(1),
(2) Date: Dec. 20, 2013

(87) PCT Pub. No.: WO2014/109789
PCT Pub. Date: Jul. 17, 2014

(65) Prior Publication Data
US 2014/0268556 A1 Sep. 18, 2014

Related U.S. Application Data

(60) Provisional application No. 61/750,353, filed on Jan. 8, 2013.

(51) Int. Cl.
H02J 7/00 (2006.01)
G06F 1/16 (2006.01)
(Continued)

(52) U.S. Cl.
CPC ............ G06F 1/263 (2013.01); G06F 1/1632 (2013.01); G06F 1/1635 (2013.01); G06F 1/1669 (2013.01); G06F 1/189 (2013.01)

(58) Field of Classification Search
CPC ...... H02J 7/0022; H02J 7/0031; H02J 7/0068; H02J 7/022; H02J 7/0073; Y02E 60/12;
(Continued)

(56) References Cited

U.S. PATENT DOCUMENTS 5,418,401 A * 5/1995 Kaneyuki ............. H02J 7/1423
307/10.1
5,742,150 A * 4/1998 Khuwatsamrit .... H01M 10/441
320/116
(Continued)

FOREIGN PATENT DOCUMENTS

CN 1230295 A 9/1999
CN 101728859 6/2010
(Continued)

OTHER PUBLICATIONS

Taiwanese Office Action for Application 103100539 dated Dec. 14, 2015.
(Continued)

Primary Examiner — Yalkew Fantu
Assistant Examiner — Mohammed J Sharief
(74) Attorney, Agent, or Firm — Schwabe, Williamson & Wyatt, P.C.

(57) ABSTRACT

A computing system may include a base portion to receive one or more first batteries, and a tablet portion having one or more electronic components and the tablet portion to receive one or more second batteries. The tablet portion may be configured to be coupled to and detached from the base portion. The computing system may also include circuitry to control a supply of voltage to one or more electronic components of the tablet portion from one or more first batteries at the base portion and from one or more second batteries at the tablet portion.

22 Claims, 3 Drawing Sheets

(51) Int. Cl.
*G06F 1/26* (2006.01)
*G06F 1/18* (2006.01)

(58) Field of Classification Search
CPC .... H01M 10/44; G06F 1/1616; G06F 1/1656; G06F 1/1632; G06F 1/1679; G06F 1/1635
USPC .............................. 320/128, 137; 361/679.55
See application file for complete search history.

(56) References Cited

U.S. PATENT DOCUMENTS

| | | | |
|---|---|---|---|
| 9,030,152 B2* | 5/2015 | Liang | H02J 7/0068 320/103 |
| 2001/0001083 A1 | 5/2001 | Helot | |
| 2005/0073282 A1* | 4/2005 | Carrier | B25F 5/00 320/106 |
| 2007/0120525 A1 | 5/2007 | Tsuji | |
| 2008/0052428 A1* | 2/2008 | Liang | G06F 1/206 710/62 |
| 2008/0104300 A1* | 5/2008 | Diener | G06F 1/1632 710/303 |
| 2008/0162972 A1 | 7/2008 | Liu et al. | |
| 2008/0197801 A1 | 8/2008 | Manor et al. | |
| 2008/0291571 A1 | 11/2008 | Miyake et al. | |
| 2009/0058354 A1* | 3/2009 | Harrison | A45B 3/00 320/101 |
| 2009/0112496 A1* | 4/2009 | Suzuki | H02J 7/0022 702/63 |
| 2009/0160404 A1 | 6/2009 | Iwai | |
| 2010/0244765 A1 | 9/2010 | Collopy et al. | |
| 2011/0074338 A1 | 3/2011 | Wu | |
| 2011/0121653 A1 | 5/2011 | Hartular et al. | |
| 2011/0167290 A1 | 7/2011 | Yoshimoto et al. | |
| 2011/0320405 A1 | 12/2011 | Hsu et al. | |
| 2012/0266001 A1* | 10/2012 | Sha | H02J 7/0054 713/300 |
| 2013/0181681 A1* | 7/2013 | Mukai | H02J 7/0031 320/134 |
| 2013/0328399 A1* | 12/2013 | Suzuki | G06F 1/1654 307/29 |
| 2014/0098485 A1* | 4/2014 | Vahid | G06F 1/1632 361/679.41 |

FOREIGN PATENT DOCUMENTS

| | | |
|---|---|---|
| JP | 2003-044166 | 2/2003 |
| JP | 2006-308919 | 11/2006 |
| JP | 2007-149009 | 6/2007 |
| JP | 2008-165797 | 7/2008 |
| JP | 2008-533961 | 8/2008 |
| JP | 2009-065347 | 3/2009 |
| JP | 2009-151488 | 7/2009 |
| JP | 2012-010578 | 1/2012 |
| JP | 2012130556 * | 7/2012 |
| JP | 2012-521602 | 9/2012 |
| JP | 2013-254408 | 12/2013 |
| KR | 10-2010-0037498 A | 4/2010 |
| KR | 10-2011-0136327 A | 12/2011 |
| TW | 201021350 A | 6/2010 |
| WO | 2014/109789 A1 | 7/2014 |

OTHER PUBLICATIONS

Taiwanese Search Report dated Dec. 14, 2015.
English language translation of Taiwanese Office Action and Search Report.
Japanese Office Action for Application 2015-546451 dated Jun. 7, 2016 (full Japanese text and full English language translation).
Japanese Office Action issued in application 2016-546451 dated Nov. 8, 2016 (full Japanese text and full English translation).
Korean Office Action dated Nov. 30, 2016 (full Korean text).
Chinese Office Action issued in Application No. 201380064026.6 dated Jan. 11, 2017 (full Chinese text).
International International Search Report and Written Opinion dated Oct. 18, 2013 for corresponding Application No. PCT/US2013/048713.
Office Action dated Sep. 22, 2017 for Chinese Patent Application No. 201380064026.6, 10 pages.

* cited by examiner

DETACHABLE COMPUTING SYSTEM HAVING BI-DIRECTIONAL POWER FLOW

CROSS-REFERENCE TO RELATED APPLICATION

This present application claims priority from U.S. Provisional Application No. 61/750,353, filed Jan. 8, 2013, the subject matter of which is incorporated herein by reference.

BACKGROUND

1. Field

Embodiments may relate to a detachable computing system having a first battery and a second battery.

2. Background

A detachable computing system may include a tablet and a base that may be coupled together or may be disconnected from each other. A battery may be used to power the computing system.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
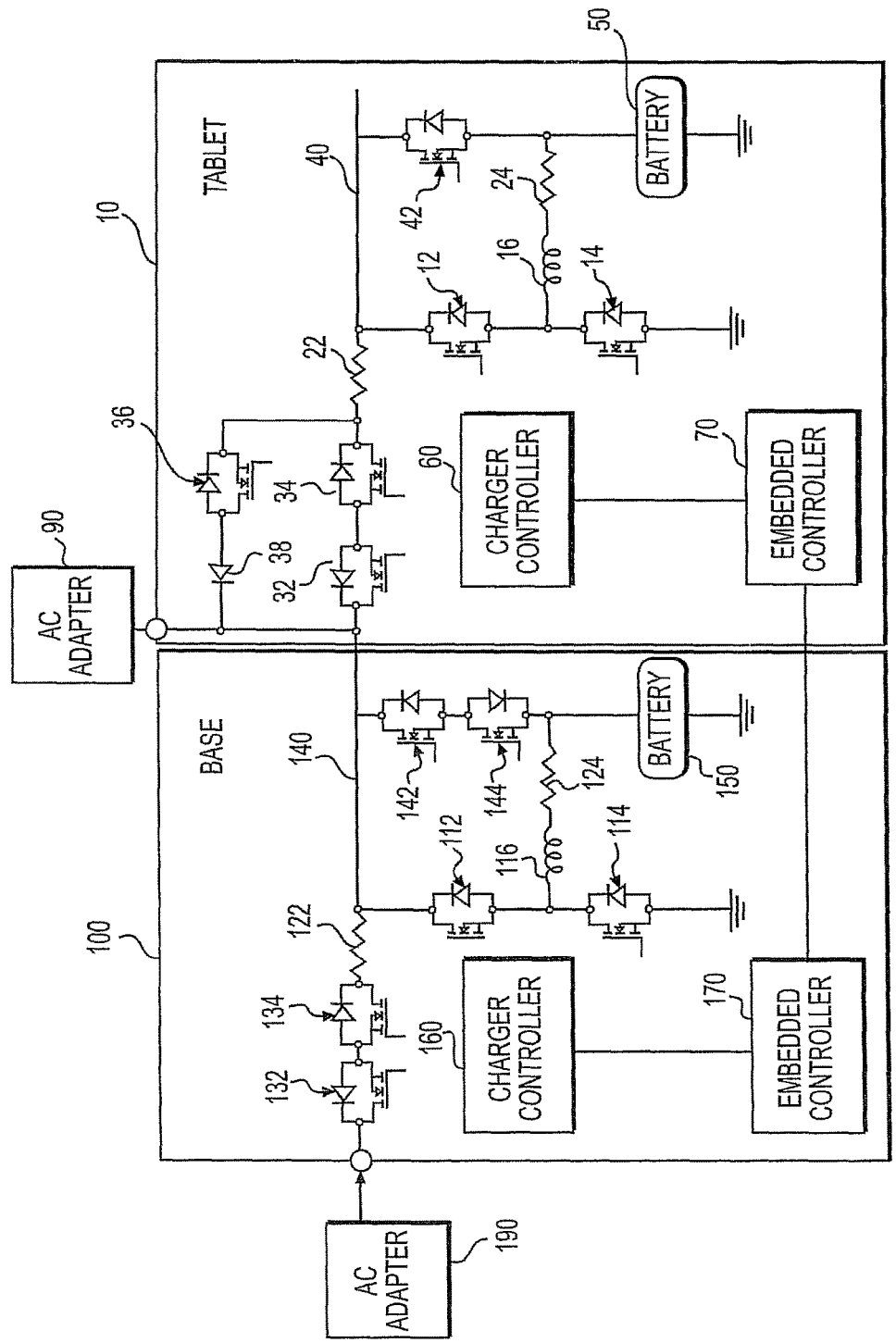
FIG. 1 shows power delivery circuitry for a detachable computing system having two batteries according to an example embodiment.

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

A detachable computing system may have a display or tablet portion that may be detachably coupled to a base portion. The display or tablet portion may be detached from the base portion and configured to allow a user to operate the display or tablet portion as a tablet computing system. When attached to the base portion, the display or tablet portion may be used as a display or a touch-sensitive display device.

In at least one embodiment, the detachable computing system may be in a notebook or laptop configuration when the display or tablet portion is attached to the base portion. The base portion may have a keyboard, a touchpad, and/or a touch-sensitive display device to allow a user to enter information into the detachable computing system. In at least one embodiment, the base portion may be a docking station. The display or tablet portion may be detachably coupled to the base portion in any suitable manner, for example using one or more suitable docking connectors.

The display or tablet portion may hereafter be referred to as a tablet. The base portion may hereafter be referred to as a base.

In at least one embodiment, the tablet may include any suitable one or more electronic components to operate as a computing device. In at least one embodiment, the tablet may include any suitable one or more processors, processor cores or controllers to execute instructions from at least one non-transitory computer readable media, such as a non-volatile memory or storage device, for example. In at least one embodiment, the tablet may include a system-on-chip (SoC) having one or more processor cores as well as any suitable one or more other functional blocks, such as an input/output block, a memory controller, one or more graphics processors, an embedded controller, a charger controller, etc. In at least one embodiment, the tablet may include any suitable communications device to communicate wirelessly over a network.

In at least one embodiment, the detachable computing system may support a boosted performance mode (or turbo boost mode). The boosted performance mode may be a turbo mode. In at least one embodiment, the detachable computing system may operate in a smooth, efficient and/or user friendly manner while supporting a boosted performance mode.

The detachable computing system may receive (or include) two batteries, namely a first battery (Battery 1) in the tablet and a second battery (Battery 2) in the base. The detachable computing system may operate when the second battery (in the base) has significantly less capacity as compared to the first battery (in the tablet). The detachable computing system may also operate when either the first battery (in the tablet) or the second battery (in the base) is fully discharged (or below a prescribed minimum value) to enhance the end-user experience.

The first battery may be received at a battery port of the tablet. The second battery may be received at a battery port of the base.

Although described in the context of the first battery and the second battery, embodiments may utilize more than one battery (in place of the first battery) in the tablet and/or more than one battery (in place of the second battery) in the base.

Embodiments may provide a computing system that includes a base (portion) to receive at least one battery, and a tablet (portion) having at least one electronic component and to receive at least one battery. The tablet (portion) may be configured to be coupled to and detached from the base (portion). The computing system may also include circuitry to control supply of voltage to the at least one electronic component of the tablet portion from the at least one battery at the base and from the at least one second battery at the tablet. The tablet may include circuitry, and the base may include circuitry.

FIG. 1 shows power delivery circuitry for a detachable computing system having two batteries according to an example embodiment. Other embodiments and configurations may also be provided.

FIG. 1 shows a detachable computing system that includes a tablet 10 and a base 100. The tablet 100 may be mounted, coupled and/or docked to the base 100 by a docking connector (or docking member). For ease of discussion, the tablet 10 may be considered to be docked or not docked (via the docking connector) to the base 100. In at least one embodiment, the docking connector may be considered as part of the tablet 10. In at least one embodiment, the docking connector may be considered as part of the base 100.

FIG. 1 shows power delivery circuitry (or circuits) of the tablet 10 on a right side of FIG. 1. FIG. 1 shows power delivery circuitry (or circuits) of the base 100 on a left side of FIG. 1.

FIG. 1 shows an alternate current (AC) adapter 90 that may electrically connect to the tablet 10 when the tablet 10 is not docked (or is disconnected from) to the base 100. The AC adapter 90 may be electrically connected to a connector member that is part of the docking connector to couple to the tablet 10 to the base 100.

The AC adapter 90 may provide a voltage (or power) to the tablet 10.

FIG. 1 also shows an AC adapter 190 that may electrically connect to the base 100 either when the tablet 10 is docked to the base 100 via the docking connector or when the tablet 10 is not docked to the base 100. The AC adapter 190 may be coupled to an input port of the base 100.

The tablet 10 may include a tablet battery charger to charge a battery 50 (or a tablet battery). The battery 50 may be provided at a battery port of the tablet 10. The tablet battery charger may include switches 12, 14, an inductor 16 and charger sense resistors 22, 24. The switches 12, 14 may each include a field effect transistor (FET) and a diode coupled in parallel, for example. Other configurations of the tablet battery charger may also be provided.

The tablet 10 may also include a switch 32 and a switch 34 coupled in series to receive an input to the tablet 10. The input to the tablet 10 may be an input voltage from the AC adapter 90 when the tablet 10 is not docked to the base 100. The input to the tablet 10 may be an input voltage from the base 100 when the tablet 10 is docked to the base 100 via the docking connector.

The switches 32 and 34 coupled in series may be considered pass-FETs. The switches 32 and 34 may each include a FET and a diode coupled in parallel, for example.

The tablet 10 may also include a switch 36 and a diode 38 coupled in series. The switch 36 and the diode 38 may be used to conduct power from the tablet 10 to the base 100. In at least one embodiment, the switch 36 may not be provided and its function may be performed by the switch 34.

The tablet 10 may include at least one power rail 40 to provide a voltage (or power) to electronic components of the tablet 10. The electronic components may also be referred to as a tablet system. A switch 42 may be coupled between the power rail 40 and the tablet battery 50. The switch 42 may be considered a protection FET for the tablet battery 50 (Battery 1). The switch 42 may include a FET and a diode coupled in parallel, for example.

The tablet 10 may also include a charger controller 60 and an embedded controller 70. In at least one embodiment, the charger controller 60 and the embedded controller 70 may be configured as a single controller. The charger controller 60 and/or the embedded controller 70 may contain logic, hardware and/or software to control circuitry of the tablet 10.

The charger controller 60 may operate to control charging of the tablet battery 50 and protect the AC adapter 90 from over-current. The embedded controller 70 may provide information to the charger controller 60, such as charge current and voltage commands of the tablet battery 50 and a maximum current of the AC adapter 90 (or the maximum base current when the tablet 10 is docked).

The charger controller 60 and/or the embedded controller 70 may provide control signals to each of the switches 12, 14, 32, 34, 36, 42 of the tablet 10. The control signals may turn the respective switches either on or off.

The base 100 may include a base battery charger to charge a battery 150 (or a base battery). The battery 150 may be provided at a battery port of the base 100. The base battery charger may include switches 112, 114, an inductor 116 and charger sense resistors 122, 124. The switches 112, 114 may each include a FET and a diode coupled in parallel, for example. Other configurations of the base battery charger may also be provided.

The base 100 may also include a switch 132 and a switch 134 coupled in series to receive an input power, such as from the AC adapter 190. The switches 132 and 134 coupled in series may be considered pass-FETs. The switches 132 and 134 may each include a FET and a diode coupled in parallel, for example.

The base 100 may include at least one power rail 140 to provide a voltage (or power) to electronic components of the base 100 and/or to provide a voltage to the tablet 10 when the tablet 10 is docked to the base 100 (via the docking connector). The electronic components may also be referred to as a base system. A switch 142 and a switch 144 may be provided in series between the power rail 140 and the base battery 150. The switch 142 may be considered a protection FET for the base battery 150 (Battery 2). The switches 142, 144 may each include a FET and a diode coupled in parallel, for example. In at least one embodiment, the switch 144 may be an isolation FET, which may decouple the base battery 150 from the power rail 140 of the base 100.

The base 100 may also include a charger controller 160 and an embedded controller 170. In at least one embodiment, the charger controller 160 and the embedded controller 170 may be configured as a single controller. The charger controller 160 and/or the embedded controller 170 may contain logic, hardware and/or software to control circuitry of the tablet 10.

The charger controller 160 may operate to control charging of the base battery 150 and protect the AC adapter 190 from over-current. The embedded controller 170 (EC2) may provide information to the charger controller 160, such as charge current and voltage commands of the base battery 150 and a maximum current of the AC adapter 190.

The charger controller 160 and/or the embedded controller 170 may provide control signals to each of the switches 112, 114, 132, 134, 142, 144 of the base 100. The control signals may turn the respective switches either on or off.

The embedded controller 70 of the tablet 10 may communicate with the embedded controller 170 of the base 100 via the docking connector.

The switches 32, 34, 42, 132, 134 and/or 142 (or pass FETs) may each be p-channel FET or an n-channel FET.

The charger controller 60, the embedded controller 70, the charger controller 160, and/or the embedded controller 170 may be implemented using any suitable logic at least a portion of which is in hardware to function as indicated. For one embodiment, any one or more of the charger controller 60, the embedded controller 70, the charger controller 160, and/or the embedded controller 170 may be implemented in hardware logic to function as indicated. In at least one embodiment, any one or more of the charger controller 60, the embedded controller 70, the charger controller 160, and/or the embedded controller 170 may be implemented with hardware logic that can execute instructions of software and/or firmware from at least one nontransitory computer readable media. The instructions may be in the form of code that may be provided from a computer-readable medium.

In at least one embodiment, the base battery 150 may have a higher output voltage than the tablet battery 50. In at least one embodiment, the base battery 150 may have 3 or 4 cells provided in series, while the tablet battery 50 may have fewer cells, such as 2 cells or 3 cells, provided in series.

In at least one embodiment, a voltage of the base battery 150 may be sufficiently larger than a voltage of the tablet battery 50. This may allow user-friendly operation of the 2-battery detachable computing system.

When the tablet 10 is not docked (or is detached from) to the base 100 via the docking connector, the tablet 10 may operate as a computer. The AC adapter 90 may be attached to the tablet 10 at a same electrical point (or same electrical connection) as at least one contact of the docking connector.

In order to prevent the tablet battery 50 from back drive, when the AC adapter 90 is electrically disconnected from the tablet 10, then the switches 34 and 36 may be turned off by the embedded controller 70 and/or the charger controller 60.

When the tablet 10 is in a boosted performance mode (and is not docked to the base 100), the tablet battery 50 may supplement the AC adapter 90 when the maximum adapter power is less than the system power requirement. The boosted performance mode may also be called a turbo mode.

When the tablet 10 is not docked to the base 100 (via the docking connector), the base 100 may also be electrically connected to the AC adapter 190 to charge the base battery 150 and/or provide power to electronic components of the base 100.

When the tablet 10 is docked to the base 100 via the docking connector (i.e., the AC adapter 90 is not coupled to the tablet 10), then the base battery 150 may be treated by the computing system in a same fashion as the AC adapter 190 and the base battery 150 may be used to support the computing system and charge the tablet battery 50.

An input current limit of the tablet charger may be changed to be equal to a maximum current of the base battery 150 and thus protect the base battery 150 from delivering more power than is allowed. In this example, if the detachable computing system requires more power than the specified maximum output power of the base battery 150, the tablet battery 50 may supplement the base battery 150 through the tablet charger. Because the voltage of the base battery 150 is greater than the voltage of the tablet battery 50, the tablet charger may consider the base battery 150 to be analogous to the AC adapter 190 (although it may have different power capabilities than the AC adapter 190), and the tablet charger may automatically turn off the switch 42, and turn on the switches 32 and 34. This may allow power to be provided from the base 100 to the tablet 10. If the computing system consumes power greater than capability of the base battery 150, then the tablet battery 50 may be used to supplement the base battery 150, such as in a turbo mode.

When the base battery 150 is discharged (or is discharged to below a prescribed minimum value), the embedded controller 170 of the base 100 may turn the switch 144 off, and the tablet 10 may operate based on the tablet battery 50. The diode 38 and the switch 36 (turned on) may operate to allow the base 100 to be powered by the tablet battery 50 when the base battery 150 is discharged (or is below a prescribed minimum value). More specifically, the switch 36 may be turned on when the tablet 10 is docked to the base 100 via the docking connector. The diode 38 may provide protection under several circumstances such as when the base battery 150 is connected to the power rail 140 of the base, or the tablet battery 50 is used to power the base 100 and the tablet 10, and/or when a user suddenly connects the AC adapter 190 to the base 100. The diode 38 may be reverse-biased and stop conducting, and the base 100 may be separated from the tablet 10 until the switches 32 and 34 are turned on by the tablet charger and the switch 42 (i.e., the protection switch of the tablet battery 50) is turned off.

In at least one embodiment, circuitry may supply voltage to at least one electronic component of the tablet 10 from the base battery 150 and from the tablet battery 50 at a same time.

In at least one embodiment, circuitry may control charging of the base battery 150 from the tablet battery 50.

In an embodiment in which the switches 32 and 34 include p-FETs, the tablet configuration may be different. More specifically, FIG. 2 shows an embodiment in which both the diode 38 and the switch 36 are not provided.

Figure 2:
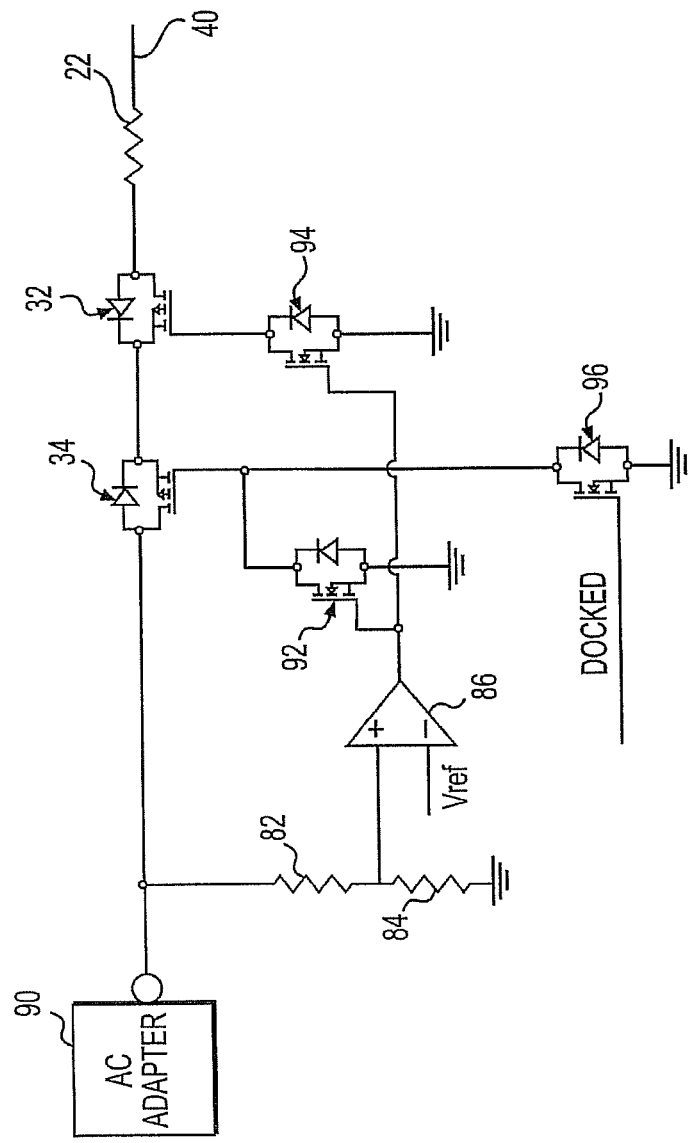
FIG. 2 shows power delivery circuitry for a tablet that allows bi-directional power flow according to an example embodiment.

FIG. 2 shows power delivery circuitry for a tablet that allows bi-directional power flow according to an example embodiment. Other embodiments and configurations may also be provided.

FIG. 2 shows that switches 32 and 34 are p-FETs. The p-FETs may be considered pass-FETs. FIG. 2 does not include the switch 36 and the diode 38, as shown in FIG. 1, because they may not be needed in this embodiment.

FIG. 2 shows a voltage divider (including resistors 82, 84), a comparator 86 and switches 92, 94 and 96. The switches 92, 94, 96 may each include a FET and a diode coupled in parallel, for example.

A tablet input voltage may be provided to the voltage divider (such as from the AC adapter 90). The input voltage may be divided by the resistors 82 and 84 of the voltage divider, and the divided voltage may be provided to an input of the comparator 86.

The comparator 86 may compare the divided voltage (from the voltage divider) with a reference voltage (Vref) and provide an output voltage based on the comparison. For example, when the divided voltage is greater than the reference voltage, then the output voltage (from the comparator 86) may be provided to each of the switches 92 and 94.

The switch 96 may receive a "DOCKED" logic signal from the embedded controller 70 (or an independent logical circuit). The "DOCKED" logical signal may represent that the tablet 10 is docked to the base 100 via the docking connector.

The switch 34 may receive a control signal from either the switch 92 or the switch 96.

The switch 92 may be used to control the switch 34 by turning the switch 34 on or off. The switch 94 may be used to control the switch 32 by turning the switch 32 on or off. A time-delaying resistor-capacitor (RC) circuit may be used for the switch 94 in order to slow down the turn-on of the switches 94 and 32, while allowing the fast turn off of the switches 94 and 32.

The switch 34 (or the pass FET) may be independently turned on by the switch 96 based on the "DOCKED" logical signal from the embedded controller 70 (or an independent logical circuit).

When the tablet 10 is docked to the base 100 via the docking connector, the switch 34 may be turned on (unless the embedded controller 70 turns the switch 34 off for protection reasons). If the computing system determines that the base battery 150 is discharged (or is below a prescribed minimum value), then the switch 144 may be turned off, and the tablet battery 50 may supply voltage to the tablet 10 (through the switch 42, which may initially conduct as the body diode of the switch 32 and then may be turned on as the pass FET either by the tablet charger or the embedded controller 70).

The tablet battery 50 may also support the base 100 through the switch 34 (i.e., the pass FET) (which may be turned on during docking) and the body diode of the switch 32 (i.e., the switch 32 itself may be turned off). Thus, the tablet battery 50 may be capable of seamlessly supporting the base 100 when the base battery 150 is discharged and is turned off by the computing system. A Schottky diode may also be provided in parallel with the switch 32 (in a same direction as the body diode of the switch 32) in order to lower the voltage drop and allow more power transfer from the tablet 10 to the base 100.

When the tablet 10 is docked (or connected) to the base 100 via the docking connector and the AC adapter 190 is used to power the computing system, the tablet battery 50 may be first charged while the base charger current may be set to 0. When the tablet battery 50 is fully charged (or is charged to above constant current level), then the base charger may charge the base battery 150 while the tablet charger may be set to a 0 charging current (or the tablet charger may be in a constant voltage mode or a trickle charge mode).

If the power consumption of the detachable computing system becomes greater than the power capability of the AC adapter 190, then the base battery 150 or the tablet battery 50 may supplement the adapter power. This may be done based on the battery power capability. If the power capability of the base battery 150 is sufficient to support a boosted performance mode (or a turbo mode), then a hybrid power boost mode of the base charger may be provided. If the power capability of the base battery 150 is insufficient, then the tablet battery 50 may be used to supplement the AC adapter 190.

When the computing system is turned off or is not being used while the AC adapter 190 is electrically coupled to the base 100, both the tablet battery 50 and the base battery 150 may be independently charged at a same time as long as a total power does not exceed a limit of the AC adapter 190.

In at least one embodiment, the embedded controller 70 and the embedded controller 170 may communicate with each other regarding information such as status of the tablet battery 50 and/or the base battery 150, and/or source of power from the base 100 to the tablet 10 provided by the AC adapter 190 or the base battery 150.

Figure 3:
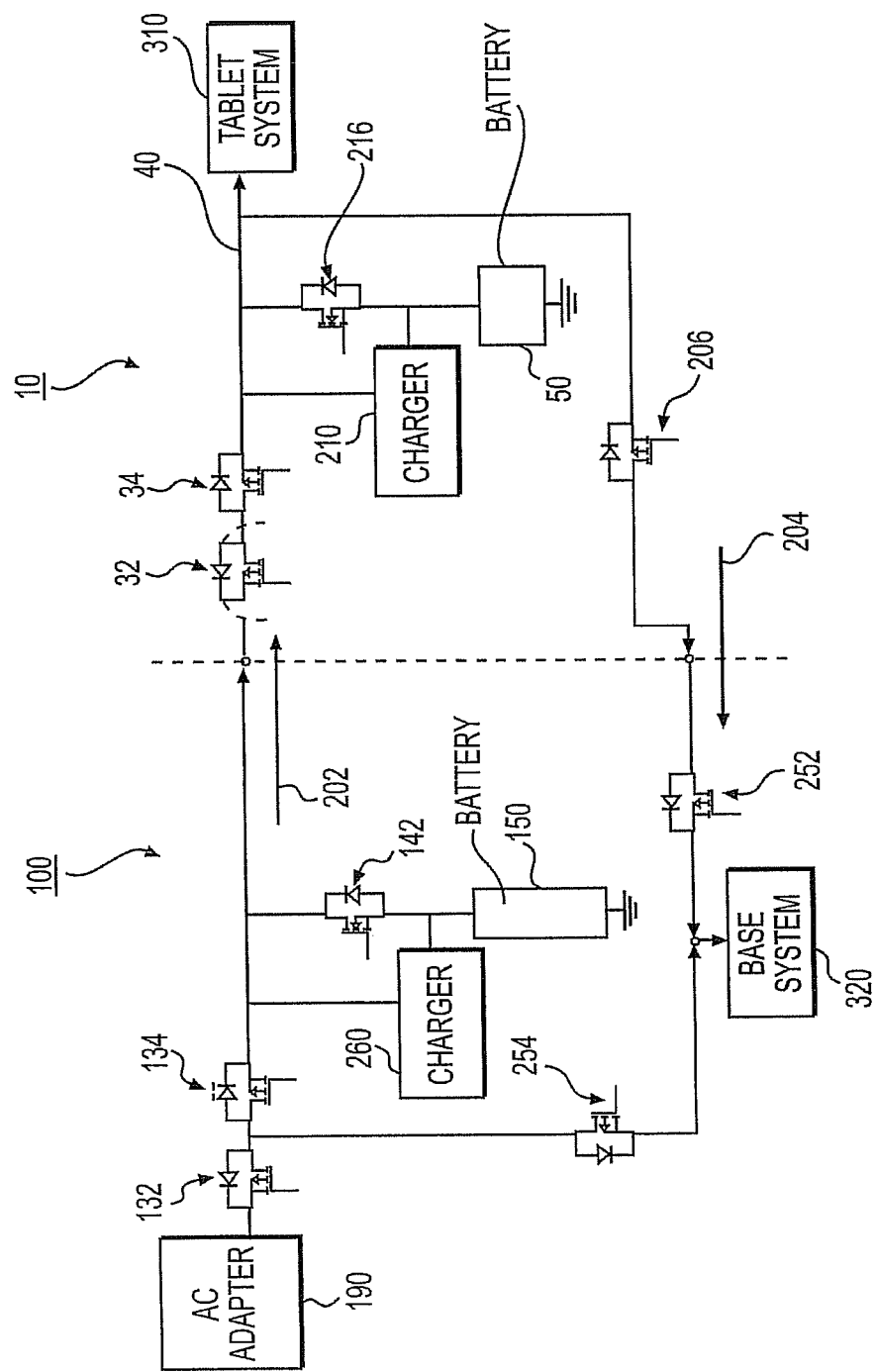
FIG. 3 shows power delivery circuitry for a detachable computing system according to another example embodiment.

FIG. 3 shows power delivery circuitry for a detachable computing system according to another example embodiment. Other embodiments and configurations may also be provided.

FIG. 3 shows two separate power paths provided in the docking connector between the base 100 and the tablet 10. FIG. 3 shows a first power path 202 from the base 100 to the tablet 10. In the first power path 202, power may only flow from the base 100 to the tablet 10. FIG. 3 also shows a second power path 204 from the tablet 10 to the base 100. In the second power path 204, power may only flow from the tablet 10 to the base 100.

When the tablet 10 is docked to the base 100 via the docking connector, then either the AC adapter 190 or the base battery 150 may provide power (or voltage) to the tablet 10 through the first power path 202 (from the base 100 to the tablet 10).

Power (or voltage) may also be provided along the second power path 204 from the tablet 10 to the base 100 in order to power the base 100.

The tablet 10 includes the switches 32 and 34 coupled in series, and the switch 42 coupled between the power rail 40 and the battery 50. FIG. 3 also shows a battery charger 210, which may include components similar to the FIG. 1 embodiment. A tablet system 310 may include electronic components of the tablet 10.

The base 100 includes the switches 132 and 134 coupled in series, and the switch 142 coupled between the power rail 140 and the battery 150. FIG. 3 also shows a base charger 260, which may include components similar to the FIG. 1 embodiment. A base system 320 may include electronic components of the base 100.

The tablet 10 may also include a switch 206 along the power path 204. The base 100 may also include a switch 252 and a switch 254 along the power path 204. The switches 206, 252 and 254 may each include a FET and a diode coupled in parallel, for example, Each of the switches 206 and 252 may be controlled by a docking signal (or "DOCKED" logic_signal) that may be provided from the embedded controllers 70, 170 (or an independent logical circuit). For example, when the tablet 10 is docked to the base 100 via the docking connector, both the switches 206 and 252 may be turned ON. When the tablet 10 is not docked to the base 100, then both the switches 206 and 252 may be OFF to prevent a potential short circuit on the exposed contact on the docking connector.

Additionally, the switch 254 of the base 100 may be OFF when the tablet 10 is docked to the base 100 via the docking connector, and the switch 254 may be ON when the tablet 10 is not docked to the base 100 and the AC adapter 190 is electrically coupled to the base 100. This may allow the embedded controller 170 and the base charger 260 to be powered and charge the base battery 150 when the tablet 10 is not docked to the base 100.

The tablet charger 210 may control switches 32, 34, 42 of the tablet 10 by providing control signals to turn the respective switches on or off. The base charger 260 may control switches 132, 134, 142 of the base 100 by providing control signals to turn the respective switches on or off. When the base battery 150 in the base 100 is discharged and no AC adapter 190 is electrically coupled to (or plugged into) the base 100, then the embedded controller 70 may turn off the switch 32 and the whole computing system may operate on the tablet battery 50.

In at least one embodiment, a computing system may comprise: a base portion (or base) to receive one or more first batteries, and a tablet portion (or tablet) having one or more electronic components. The tablet portion to receive one or more second batteries, and the tablet portion configured to be coupled to and detached from the base portion. The computing system may further comprise means for controlling supply of voltage to one or more electronic components of the tablet portion from one or more first batteries at the base portion and from one or more second batteries at the tablet portion.

The means for controlling supply of voltage to control supply of the voltage from an alternate current (AC) adapter to the one or more electronic components of the tablet portion.

The means for controlling supply of voltage to control charging one or more second batteries at the tablet portion from one or more first batteries at the base portion.

The means for controlling supply of voltage to control supply of voltage to the one or more electronic components of the tablet portion from one or more first batteries at the base portion and, at a same time, from the one or more second batteries at the tablet portion.

The means for controlling supply of voltage to control the supply of voltage from the one or more first batteries at the base portion and from the one or more second batteries at the tablet portion when at least the tablet portion is in a turbo mode.

The means for controlling supply of voltage to control charging one or more first batteries at the base portion by one or more second batteries at the tablet portion.

In at least one embodiment, a computing system may comprise: a base portion (or base) to receive one or more first batteries, and a tablet portion (or tablet) having one or more electronic components. The tablet portion to receive one or more second batteries, and the tablet portion configured to be coupled to and detached from the base portion. The computing system may further comprise means for controlling charging of one or more first batteries at the base portion from one or more second batteries at the tablet portion.

The one or more second batteries at the tablet portion to charge the one or more first batteries at the base portion when the computing system is not electrically coupled to an alternate current (AC) adapter.

The means for controlling charging to control charging one or more second batteries at the tablet portion from one or more first batteries at the base portion.

In at least one embodiment, a computing system may comprise: a base portion (or base) to receive one or more first batteries, and a tablet portion (or tablet) having one or more electronic components. The tablet portion to receive one or more second batteries, and the tablet portion configured to be coupled to and detached from the base portion. The computing system may further comprise circuitry to control supply of voltage to one or more electronic components of the tablet portion from one or more first batteries at the base portion and from one or more second batteries at the tablet portion.

The circuitry to control supply of the voltage from an alternate current (AC) adapter to the one or more electronic components of the tablet portion.

The circuitry to control charging one or more second batteries at the tablet portion from one or more first batteries at the base portion.

The circuitry to control supply of voltage to the one or more electronic components of the tablet portion from the one or more first batteries at the base portion and, at a same time, from the one or more second batteries at the tablet portion.

The circuitry to control the supply of voltage from the one or more first batteries at the base portion and from the one or more second batteries at the tablet portion when at least the tablet portion is in a turbo mode.

The circuitry to control charging of one or more first batteries at the base portion by one or more second batteries at the tablet portion.

In at least one embodiment, a computing system may comprise: a base portion (or base) to receive one or more first batteries, and a tablet portion (or tablet) having one or more electronic components. The tablet portion to receive one or more second batteries, and the tablet portion configured to be coupled to and detached from the base portion. The computing system may further comprise circuitry to control charging of one or more first batteries at the base portion from one or more second batteries at the tablet portion.

The one or more second batteries at the tablet portion to charge the one or more first batteries at the base portion when the computing system is not electrically coupled to an alternate current (AC) adapter.

The circuitry to control charging one or more second batteries at the tablet portion from one or more first batteries at the base portion.

In at least one embodiment, an apparatus may comprise: logic at least a portion of which is hardware, the logic to: control circuitry to supply voltage to one or more electronic components of a tablet portion of a detachable computing system from one or more first batteries of a base portion and from one or more second batteries of the tablet portion.

The logic to control circuitry to supply voltage from one or more first batteries at the base portion to one or more second batteries at the tablet portion.

The logic to control circuitry to control supply of voltage to the one or more electronic components of the tablet portion from the one or more first batteries at the base portion and, at a same time, from the one or more second batteries at the tablet portion.

The logic to control circuitry to supply voltage to the one or more electronic components of the tablet portion from the one or more first batteries at the base portion and from the one or more second batteries at the tablet portion when at least the tablet portion is in a turbo mode.

The logic to control circuitry to control charging of one or more first batteries at the base portion by one or more second batteries at the tablet portion.

In at least one embodiment, an apparatus may comprise: logic at least a portion of which is hardware, the logic to: control circuitry to supply voltage from one or more first batteries at a base portion of a detachable computing system to one or more second batteries in a tablet portion of the detachable computing system.

The logic to control circuitry to control charging of one or more first batteries at the base portion by one or more second batteries at the tablet portion.

In at least one embodiment, a computer-readable medium may store instructions for supplying voltage, wherein the instructions include: first code to supply voltage to one or more electronic components of a tablet portion of a detachable computing system from one or more first batteries of a base portion and from one or more second batteries of the tablet portion.

The instructions include second code to supply voltage from one or more first batteries at the base portion to one or more second batteries at the tablet portion.

The instructions include second code to supply voltage to the one or more electronic components of the tablet portion from the one or more first batteries at the base portion and from one or more second batteries at the tablet portion when at least the tablet portion is in a turbo mode.

The instructions include second code to control charging of one or more first batteries at the base portion by one or more second batteries at the tablet portion.

In at least one embodiment, a computer-readable medium may store instructions for supplying voltage, wherein the instructions include: first code to supply voltage from one or more first batteries at a base portion of a detachable computing system to one or more second batteries in a tablet portion of the detachable computing system.

The instructions include second code to supply voltage to one or more electronic components of the tablet portion from one or more first batteries at the base portion and from one or more second batteries at the tablet portion.

The second code to supply voltage to the at least one or more electronic components of the tablet portion from the one or more first batteries at the base portion and from the one or more second batteries at the tablet portion when at least the tablet portion is in a turbo mode.

The instructions include second code to control charging of one or more first batteries at the base portion by one or more second batteries at the tablet portion.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A computing system comprising:
   a base portion to receive one or more first batteries;
   a tablet portion having a tablet controller, a power rail, and one or more electronic components, the power rail to provide a voltage to the one or more electronic components, the tablet portion to receive one or more second batteries, and the tablet portion configured to be coupled to and detached from the base portion; and
   means for controlling supply of voltage to one or more electronic components of the tablet portion from the one or more first batteries at the base portion and from the one or more second batteries at the tablet portion, wherein the means for controlling supply of voltage includes the tablet controller and a plurality of switches to control supply of voltage from the one or more first batteries at the base portion and to control supply of voltage from the one or more second batteries at the tablet portion,
   wherein a first set of the plurality of switches are coupled in series at the tablet portion between an input to the tablet portion and the power rail of the tablet portion to provide the supply of voltage to the tablet portion based on at least one control from the tablet controller,
   wherein at least one of the plurality of switches, other than the first set of the plurality of switches, is coupled at the tablet portion between the power rail of the tablet portion and the base portion to provide a supply of voltage to the base portion based on at least one control signal from the tablet controller, and
   wherein the means for controlling supply of voltage is to control charging of the one or more second batteries at the tablet portion from the one or more batteries at the base portion through the first set of the plurality of switches coupled in series at the tablet portion, and
   wherein the means for controlling supply of voltage is to control supply of the voltage from an alternate current (AC) adapter to the one or more electronic components of the tablet portion, wherein the voltage from the AC adapter is to be directly connected at the input to the tablet portion and at an end of the first set of the plurality of switches.

2. The computing system of claim 1, wherein the input to the tablet portion is a part of a docking connector to couple the tablet portion to the base portion.

3. The computing system of claim 1, wherein the means for controlling supply of voltage is to control supply of voltage to the one or more electronic components of the tablet portion from the one or more first batteries at the base portion through the first set of the plurality of switches coupled in series at the tablet portion and, at a same time, from the one or more second batteries at the tablet portion.

4. The computing system of claim 3, wherein the means for controlling supply of voltage is to control the supply of voltage from the one or more first batteries at the base portion and from the one or more second batteries at the tablet portion when at least the tablet portion is in a turbo mode.

5. The computing system of claim 1, wherein the means for controlling supply of voltage is to control charging of the one or more first batteries at the base portion by the one or more second batteries at the tablet portion.

6. The computing system of claim 1, wherein when the tablet portion is not docked to the base portion, then the input to the tablet portion and the first set of the plurality of switches is to receive an input voltage from an external AC device via the AC adapter, and when the base portion is docked to the tablet portion, then the input to the tablet portion and the first set of the plurality of switches is to receive an input voltage from the base portion.

7. A computing system comprising:
   a base portion to receive one or more first batteries;
   a tablet portion having a tablet controller, a power rail, and one or more electronic components, the power rail to provide a voltage to the one or more electronic components, the tablet portion to receive one or more second batteries, and the tablet portion configured to be coupled to and detached from the base portion; and
   means for controlling charging of the one or more first batteries at the base portion from the one or more second batteries at the tablet portion through at least one switch at the tablet portion based on at least one control signal to the at least one switch, wherein the means for controlling charging includes the tablet controller to control charging the one or more second batteries at the tablet portion from the one or more first batteries at the base portion through at least two of a plurality of switches coupled in series between an input to the tablet portion from the base portion and the power rail of the tablet portion based on at least one control signal to one of the at least two of the plurality of switches,
   wherein the means for controlling charging is to control supply of the voltage from an alternate current (AC) adapter to the one or more electronic components of the tablet portion, wherein the voltage from the AC adapter is to be directly connected at the input to the tablet portion and at an end of the plurality of switches.

8. The computing system of claim 7, wherein the one or more second batteries at the tablet portion are to charge the one or more first batteries at the base portion when the computing system is not electrically coupled to the AC adapter.

9. The computing system of claim 7, wherein when the tablet portion is not docked to the base portion, then the input to the tablet portion and the at least two of the plurality of switches is to receive an input voltage from an external AC device via the AC adapter, and when the base portion is docked to the tablet portion, then the input to the tablet portion and the at least two of the plurality of switches is to receive an input voltage from the base portion.

10. A computing system comprising:
    a base portion to receive one or more first batteries;

a tablet portion having a tablet controller, a power rail, and one or more electronic components, the power rail to provide a voltage to the one or more electronic components, the tablet portion to receive one or more second batteries, and the tablet portion configured to be coupled to and detached from the base portion; and a circuitry to control supply of voltage to one or more electronic components of the tablet portion from the one or more first batteries at the base portion and from the one or more second batteries at the tablet portion, wherein the circuitry includes the tablet controller and a plurality of switches to control supply of voltage from the one or more first batteries at the base portion and to control supply of voltage from the one or more second batteries at the tablet portion, wherein a first set of the plurality of switches are coupled in series between an input to the tablet portion and the power rail of the tablet portion to provide supply of voltage to the tablet portion based on at least one control signal from the tablet controller, wherein at least one of the plurality of switches, other than the first set of the plurality of switches, is coupled at the tablet portion between the power rail of the tablet portion and the base portion to provide supply of voltage to the base portion based on at least one control signal from the tablet controller, and wherein the circuitry is to control charging the one or more second batteries at the tablet portion from the one or more first batteries at the base portion through the first set of the plurality of switches coupled in series between the input to the tablet portion and the power rail of the tablet portion, and wherein the circuitry is to control supply of the voltage from an alternate current (AC) adapter to the one or more electronic components of the tablet portion, wherein the voltage from the AC adapter is to be directly connected at the input to the tablet portion and at an end of the first set of the plurality of switches.

11. The computing system of claim 10, wherein the input to the tablet portion is part of a docking connector to couple the tablet portion to the base portion.

12. The computing system of claim 10, wherein the circuitry is to control supply of voltage to the one or more electronic components of the tablet portion from the one or more first batteries at the base portion and, at a same time, from the one or more second batteries at the tablet portion through the first set of the plurality of switches coupled in series.

13. The computing system of claim 12, wherein the circuitry is to control the supply of voltage from the one or more first batteries at the base portion and from the one or more second batteries at the tablet portion when at least the tablet portion is in a turbo mode.

14. The computing system of claim 10, wherein the circuitry is to control charging of the one or more first batteries at the base portion by the one or more second batteries at the tablet portion.

15. A computing system comprising:
a base portion to receive one or more first batteries;
a tablet portion having a power rail and one or more electronic components, the power rail to provide a voltage to the one or more electronic components, the tablet portion to receive one or more second batteries, and the tablet portion configured to be coupled to and detached from the base portion;
a first circuitry to control charging of the one or more first batteries at the base portion from the one or more second batteries at the tablet portion through at least one switch at the tablet portion based on at least one control signal to the at least one switch;
a second circuitry to control charging of the one or more second batteries at the tablet portion from the one or more first batteries at the base portion through at least two of a plurality of switches coupled in series between an input to the tablet portion from the base portion and the power rail of the tablet portion based on at least one control signal to one of the at least two of the plurality of switches; and
a third circuitry to control supply of the voltage from an alternate current (AC) adapter to the one or more electronic components of the tablet portion, wherein the voltage from the AC adapter is to be directly connected at the input to the tablet portion and at an end of the plurality of switches.

16. The computing system of claim 15, wherein the one or more second batteries at the tablet portion are to charge the one or more first batteries at the base portion when the computing system is not electrically coupled to the alternate current (AC) adapter.

17. An apparatus comprising:
a logic, at least a portion of which is hardware, the logic to: control circuitry to supply voltage to one or more electronic components of a tablet portion of a detachable computing system from one or more first batteries of a base portion and from one or more second batteries of the tablet portion, and the logic includes a tablet controller at the tablet portion and a plurality of switches to supply voltage from the one or more first batteries at the base portion and to supply voltage from the one or more second batteries at the tablet portion,
wherein a first set of the plurality of switches are coupled in series at the tablet portion between an input to the tablet portion and a power rail of the tablet portion to supply voltage to the tablet portion based on at least one control signal from the tablet controller,
wherein at least one of the plurality of switches, other than the first set of the plurality of switches, is coupled at the tablet portion between the power rail of the tablet portion and the base portion to supply voltage to the base portion based on at least one control signal from the tablet controller, and
wherein the logic is to control circuitry to control supply of voltage to the one or more electronic components of the tablet portion from the one or more first batteries at the base portion, through the first set of the plurality of switches coupled in series at the tablet portion; and
wherein the logic is to control circuitry to control supply of voltage from an alternate current (AC) adapter to the one or more electronic components of the tablet portion, wherein the voltage from the AC adapter is to be directly connected at the input to the tablet portion and at an end of the first set of the plurality of switches.

18. The apparatus of claim 17, wherein the input to the tablet portion is part of a docking connector to couple the tablet portion to the base portion.

19. The apparatus of claim 17, wherein the logic is to control circuitry to control supply of voltage to the one or more electronic components of the tablet portion from the one or more first batteries at the base portion, through the first set of the plurality of switches coupled in series at the tablet portion, and, at a same time, from the one or more second batteries at the tablet portion.

20. The apparatus of claim 17, wherein the logic is to control circuitry to supply voltage to the one or more electronic components of the tablet portion from the one or more first batteries at the base portion and from the one or more second batteries at the tablet portion when at least the tablet portion is in a turbo mode.

21. The apparatus of claim 17, wherein the logic is to control circuitry to control charging of the one or more first batteries at the base portion by the one or more second batteries at the tablet portion.

22. An apparatus comprising:
a logic, at least a portion of which is hardware, the logic to: control circuitry to supply voltage from one or more first batteries at a base portion of a detachable computing system to one or more second batteries in a tablet portion of the detachable computing system,
wherein the logic is to control circuitry to control charging of the one or more first batteries at the base portion by the one or more second batteries at the tablet portion through at least one switch at the tablet portion based on at least one control signal to the at least one switch, and
wherein the logic is to control charging of the one or more second batteries at the tablet portion from the one or more first batteries at the base portion through at least two of a plurality of switches coupled in series between an input to the tablet portion from the base portion and a power rail of the tablet portion based on at least one control signal to one of the at least two of the plurality of switches coupled in series, and
wherein the logic is to control supply of voltage from an alternate current (AC) adapter to the tablet portion, wherein the voltage from the AC adapter is to be directly connected at the input to the tablet portion and at an end of the plurality of switches.

* * * * *